US006532552B1

United States Patent
Benignus et al.

(10) Patent No.: US 6,532,552 B1
(45) Date of Patent: Mar. 11, 2003

(54) METHOD AND SYSTEM FOR PERFORMING PROBLEM DETERMINATION PROCEDURES IN HIERARCHICALLY ORGANIZED COMPUTER SYSTEMS

(75) Inventors: Douglas Marvin Benignus, Dime Box, TX (US); Mark Steven Edwards, Austin, TX (US); Arthur James Tysor, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/392,840

(22) Filed: Sep. 9, 1999

(51) Int. Cl.[7] .................................................. G06F 11/00
(52) U.S. Cl. ............................................ 714/25; 714/43
(58) Field of Search ............................... 714/40, 43, 44, 714/25, 26, 37

(56) References Cited

U.S. PATENT DOCUMENTS

| 4,380,067 A | * | 4/1983 | Beardsley et al. ............. 714/4 |
| 4,571,679 A | * | 2/1986 | Russell et al. ................ 714/25 |
| 4,606,024 A | * | 8/1986 | Glass et al. .................... 714/27 |
| 4,713,810 A | * | 12/1987 | Chum .......................... 370/243 |
| 4,996,688 A | * | 2/1991 | Byers et al. .................. 714/41 |
| 5,157,668 A | * | 10/1992 | Buenzli et al. ............... 714/26 |
| 5,189,674 A | * | 2/1993 | Shimizu ..................... 714/712 |
| 5,210,757 A | * | 5/1993 | Barlow et al. ................ 714/25 |
| 5,233,600 A | * | 8/1993 | Pekarske .................... 370/228 |
| 5,299,207 A | * | 3/1994 | Fujii ........................... 714/45 |
| 5,357,519 A | * | 10/1994 | Martin et al. .............. 702/119 |
| 5,448,772 A | * | 9/1995 | Lynne et al. ............... 324/73.1 |
| 5,500,940 A | * | 3/1996 | Skeie .......................... 714/25 |
| 5,513,341 A | * | 4/1996 | Fujii et al. ................... 714/43 |
| 5,561,760 A | * | 10/1996 | Ferris et al. .................. 714/25 |
| 5,636,203 A | * | 6/1997 | Shah .......................... 370/244 |
| 5,704,036 A | * | 12/1997 | Brownmiller et al. ...... 370/907 |
| 5,968,122 A | * | 10/1999 | Schlosser et al. ........... 709/220 |
| 5,974,568 A | * | 10/1999 | McQueen .................... 714/38 |
| 6,208,955 B1 | * | 3/2001 | Provan et al. ................ 703/20 |

* cited by examiner

*Primary Examiner*—Robert Beausoliel
*Assistant Examiner*—Gabriel L. Chu
(74) *Attorney, Agent, or Firm*—Duke W. Yee; Volel Emile; Christopher P. O'Hagan

(57) ABSTRACT

A method and system for performing problem determination procedures in a hierarchically organized computer system is provided. The hardware components of the data processing system are interconnected in a manner in which the components are organized in a logical hierarchy. A hardware-related error occurs, and the error is logged into an error log file. At some point in time, a diagnostics process is initiated in response to the detection of the error. The logged error may implicate a particular hardware component, and the hardware component of the data processing system is analyzed using a problem determination procedure. In response to a determination that the hardware component does not have a problem, the logically hierarchical parent hardware component of the hardware component is selected for analysis. The logically hierarchical parent hardware component is then analyzed using a problem determination procedure. The method continues to analyze the logically hierarchical parent components until the root component is reached or until a faulty component is found.

15 Claims, 4 Drawing Sheets

METHOD AND SYSTEM FOR PERFORMING PROBLEM DETERMINATION PROCEDURES IN HIERARCHICALLY ORGANIZED COMPUTER SYSTEMS

BACKGROUND OF THE INVENTION

1. Technical Field

The present invention relates to an improved data processing system and, in particular, to a method and system for data processing system reliability, and more specifically, to location of faulty components.

2. Description of Related Art

As computers become more sophisticated, diagnostic and repair processes have become more complicated and require more time to complete. A service technician may "chase" errors through lengthy diagnostic procedures in an attempt to locate one or more components that may be causing the errors within the computer. Diagnostic procedures generally specify several possible solutions to an error or problem in order to guide a technician to a determination and subsequent resolution of the problem. However, diagnostic procedures generally point to a component that is a likely candidate for the error, and if the component is determined to be reliable, the problem may remain unresolved until the next error occurs. In addition to paying for new components, a business must also pay for the recurring labor costs of the service technician and lost productivity of the user of the error-prone computer.

Therefore, it would be advantageous to provide a method and system for efficiently diagnosing problems within data processing systems.

SUMMARY OF THE INVENTION

A method and system for performing problem determination procedures in a hierarchically organized computer system is provided. The hardware components of the data processing system are interconnected in a manner in which the components are organized in a logical hierarchy. A hardware-related error occurs, and the error is logged into an error log file. At some point in time, a diagnostics process is initiated in response to the detection of the error. The logged error may implicate a particular hardware component, and the hardware component of the data processing system is analyzed using a problem determination procedure. In response to a determination that the hardware component does not have a problem, the logically hierarchical parent hardware component of the hardware component is selected for analysis. The logically hierarchical parent hardware component is then analyzed using a problem determination procedure. The method continues to analyze the logically hierarchical parent components until the root component is reached or until a faulty component is found.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
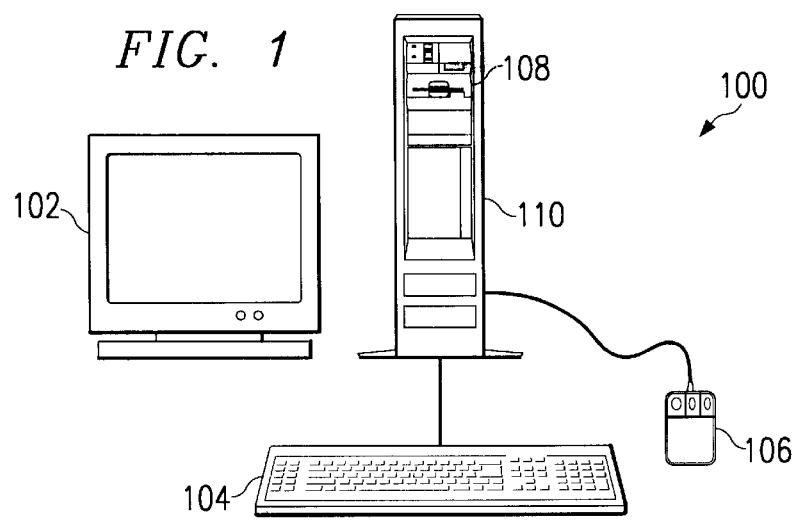
FIG. 1 is a pictorial representation depicting a data processing system in which the present invention may be implemented in accordance with a preferred embodiment of the present invention.

With reference now to FIG. 1, a pictorial representation depicts a data processing system in which the present invention may be implemented in accordance with a preferred embodiment of the present invention. A computer 100 is depicted, which includes a system unit 110, a video display terminal 102, a keyboard 104, storage devices 108, which may include floppy drives and other types of permanent and removable storage media, and mouse 106. Additional input devices may be included with computer 100. Computer 100 can be implemented using any suitable computer, for example, an IBM RISC/System 6000 system, a product of International Business Machines Corporation in Armonk, N.Y., running the Advanced Interactive Executive (AIX) operating system. Although the depicted representation shows a server-type computer, other embodiments of the present invention may be implemented in other types of data processing systems, such as workstations, network computers, Web-based television set-top boxes, Internet appliances, etc. Computer 100 also preferably includes a graphical user interface that may be implemented by means of system software residing in computer readable media in operation within computer 100.

FIG. 1 is intended as an example and not as an architectural limitation for the present invention.

Figure 2A:
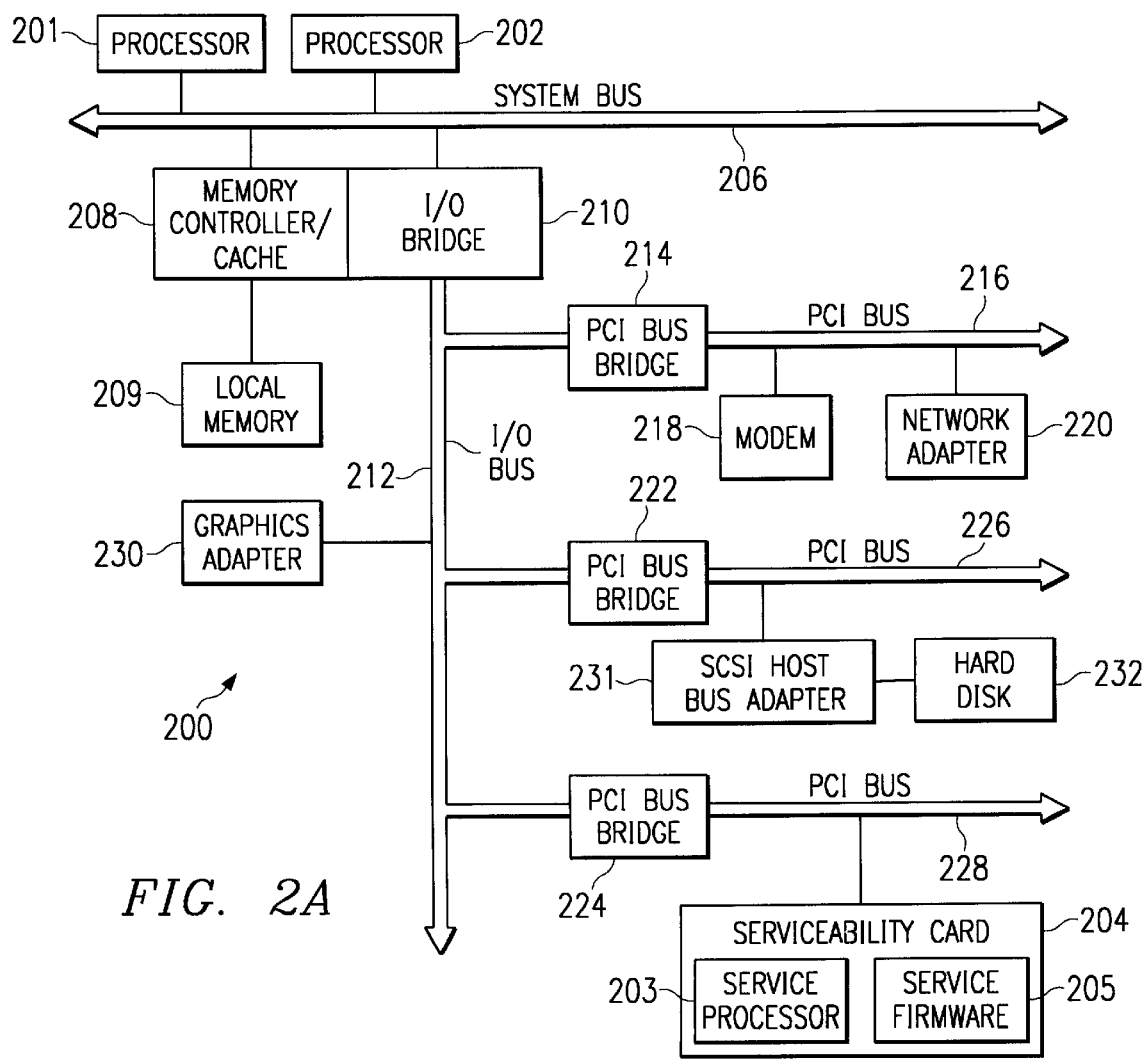
FIG. 2A is an example block diagram illustrating hierarchically organized internal components of a server-type data processing system that may implement the present invention.

With reference now to FIG. 2A, a block diagram depicts hierarchically organized internal components of a server-type data processing system which may implement the present invention. Data processing system 200 may be a symmetric multiprocessor (SMP) system including a plurality of processors 201–202 connected to system bus 206. Processors 201–203 may be any suitable processor, such as a processor selected from the PowerPC family of processors. Processor 203 is a service processor placed on serviceability card 204 along with service firmware 205, which controls the initial BIOS and also provides the ability of a system operator or service personnel to perform system diagnostics or servicing through its interface. Serviceability card 204 is connected to one of the PCI buses. Memory controller/cache 208, which provides an interface to local memory 209, is also connected to system bus 206. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A modem 218 may be connected to PCI local bus 216. Typical PCI bus implementations will support four PCI expansion slots or add-in connectors.

Additional PCI bus bridges 222 and 224 provide interfaces for additional PCI buses 226 and 228, from which additional modems or network adapters may be supported. A memory-mapped graphics adapter 230 may also be connected to I/O bus 212 as depicted, either directly or indirectly. Hard disk 232 may be connected to SCSI Host Bus Adapter 231, which is connected to one of the PCI buses. Service processor 203 or some other equivalent logic detects the error, analyzes the results, and passes the information to the operating system. The source of the error is known at this time to a reasonable percentage. The operating system does not analyze the error at this time and merely logs the error against the system planar.

For example, boot-time errors, severe intermittent problems, and adverse environmental computing conditions, such as an conditional bandwidth bottlenecks, may be logged by the service processor into an error report buffer. These errors are eventually output and reported in some form, either to a hard drive or one of many types of backup systems. Each detected error may result in the generation of an error record comprising a timestamp at the time of detection, detailed data pertinent to the failing function, including physical location code, symptom bits, etc. Further analysis is done at a later time.

Figure 2B:
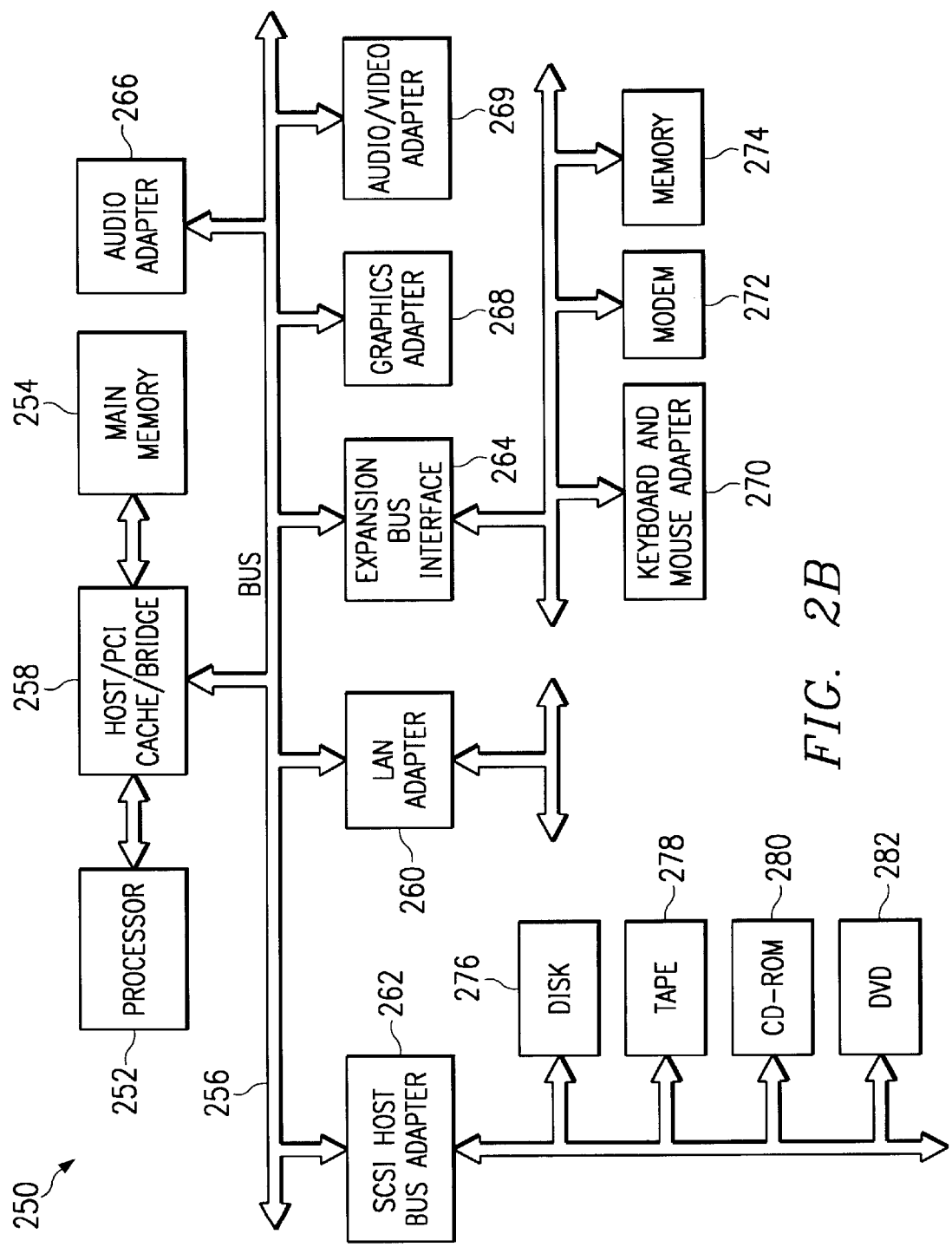
FIG. 2B is an example block diagram illustrating hierarchically organized internal components of a client-type data processing system that may implement the present invention.

With reference now to FIG. 2B, a block diagram depicts hierarchically organized internal components of a client-type data processing system which may implement the present invention. Data processing system 250 employs a peripheral component interconnect (PCI) local bus architecture. Although the depicted example employs a PCI bus, other bus architectures such as Micro Channel and ISA may be used. Processor 252 and main memory 254 are connected to PCI local bus 256 through PCI Bridge 258. PCI Bridge 258 also may include an integrated memory controller and cache memory for processor 252. Additional connections to PCI local bus 256 may be made through direct component interconnection or through add-in boards. In the depicted example, local area network (LAN) adapter 260, SCSI host bus adapter 262, and expansion bus interface 264 are connected to PCI local bus 256 by direct component connection. In contrast, audio adapter 266, graphics adapter 268, and audio/video adapter (A/V) 269 are connected to PCI local bus 266 by add-in boards inserted into expansion slots. Expansion bus interface 264 provides a connection for a keyboard and mouse adapter 270, modem 272, and additional memory 274. SCSI host bus adapter 262 provides a connection for hard disk drive 276, tape drive 278, and CD-ROM 280 in the depicted example. Typical PCI local bus implementations will support three or four PCI expansion slots or add-in connectors.

An operating system runs on processor 252 and is used to coordinate and provide control of various components within data processing system 250 in FIG. 2B. Instructions for an operating system and applications or programs are located on storage devices, such as hard disk drive 276, and may be loaded into main memory 254 for execution by processor 252. Hard disk drives are often absent and memory is constrained when data processing system 250 is used as a network client.

Those of ordinary skill in the art will appreciate that the hardware in FIG. 2A or FIG. 2B may vary depending on the implementation. For example, other peripheral devices may be used in addition to or in place of the hardware depicted in FIG. 2B. The depicted examples are not meant to imply architectural limitations with respect to the present invention.

Figure 3:
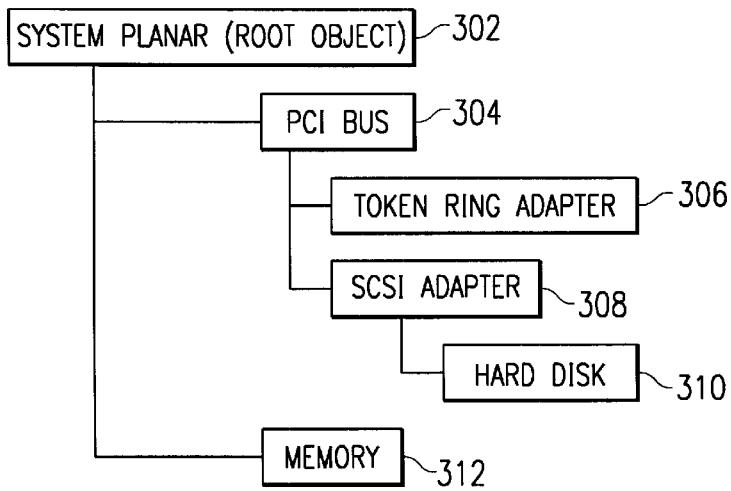
FIG. 3 is a logical representation of internal computer components representing the hierarchical organization and dependencies of those hardware components.

With reference now to FIG. 3, a logical representation of internal computer components represents the hierarchical organization and dependencies of those hardware components. Logical structure 300 shows hard disk 310 connected to SCSI adapter 308, which is plugged into PCI bus 304 on system planar 302. Memory components 312 are connected directly to system planar 302. Token ring adapter 306 is also plugged into PCI bus 304. In this manner, logical structure 300 describes the hardware components as having a parent/child relationship.

The determination of the location of problematic hardware using prior art methods often fails because the hardware component that is causing errors is often not suspected until one or more other components have been tested or analyzed using problem determination procedures. An intermittent error caused by a faulty component in a hierarchically arranged set of components frequently implicates one of its child components. When problem determination procedures are performed on the component that seems to have caused an error, no problem will be found in the component, and the location of the problem may escape detection until more diagnostics are performed at some later time in response to other errors.

Figure 4:
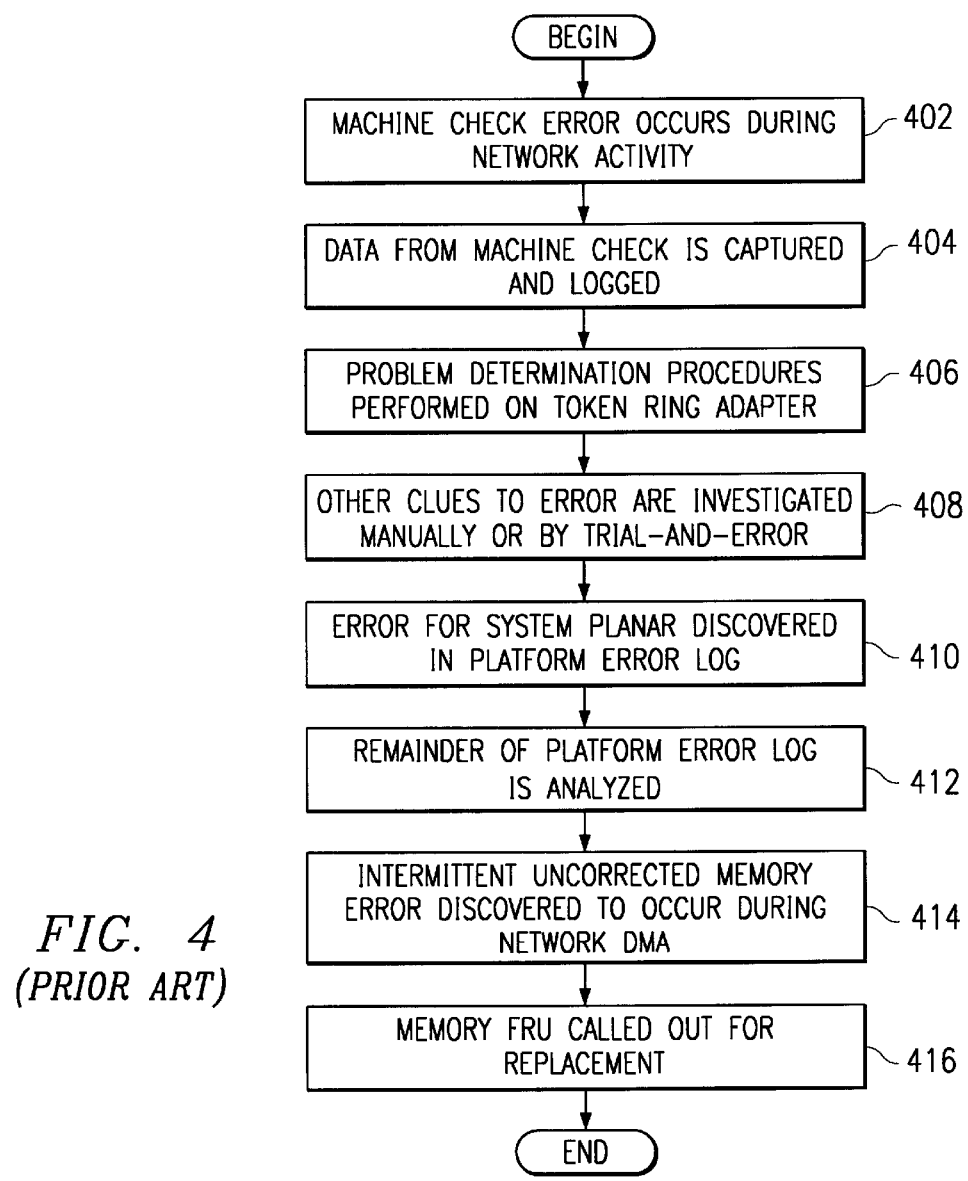
FIG. 4 is a flowchart depicting a prior art method of determining a machine check error within hardware components in a data processing system.

With reference now to FIG. 4, a flowchart depicts a prior art method of determining a machine check error within hardware components in a data processing system. The process begins with the occurrence of a machine check during network activity (step 402). A machine check is a hardware error that is severe enough to cause a gentle shutdown because data has been corrupted or because data integrity has been threatened. A reboot is generally required in response to a machine check, i.e. a machine check is generally an error from which the system may be able to recover once restarted. The hardware platform then captures data from the machine check, analyzes the data, and passes it to the operating system. The operating system then logs the information against the system planar device (step 404).

In the preferred embodiment, platform-specific errors are logged against the system planar device. Each device is represented by an object in the operating system. For this example, the system planar represents the platform as a whole. Platform-specific errors may be logged against any other object that represents the whole system or whole platform. For example, the object "sys0" could be the parent of "sysplanar0", but "sys0" may be a pseudo-device, not a field replaceable unit (FRU). However, platform-specific errors could be logged against "sys0" to indicate a system problem, and not one specific to the system planar FRU.

At some subsequent point in time, problem determination procedures are performed on the token ring adapter because the error occurred during a network operation (step 406). No problem is found because the token ring is not faulty. A service technician must investigate other clues for the cause of the problem (step 408), which may be a trial-and-error type of search or a manual search through the error log. The error against the system planar is discovered in the platform error log (step 410), and the remainder of the platform error log is further analyzed (step 412), during which an intermittent uncorrected memory error is discovered to occur during network DMA (step 414). In other words, several of these types of errors may be found to have been logged in the error log over time. The memory FRU is called out for replacement (step 416). The process then completes.

In the example in FIG. 4 of a prior art process and in the following figures of examples using the present invention, it is assumed that the data processing system contains a large number of components for which it is impractical to perform problem determination procedures on each component until a faulty component is found. It is also assumed that an error detection mechanism captures and logs data associated with the occurrences of errors.

The error logs are stored in an error log file or error log buffer. The log file consists of the data that the problem determination procedures require for analysis. The action of logging the data may start the problem determination procedure automatically. This may be accomplished by a deamon that invokes pre-registered procedures based on the personality traits of the error logged.

Figure 5:
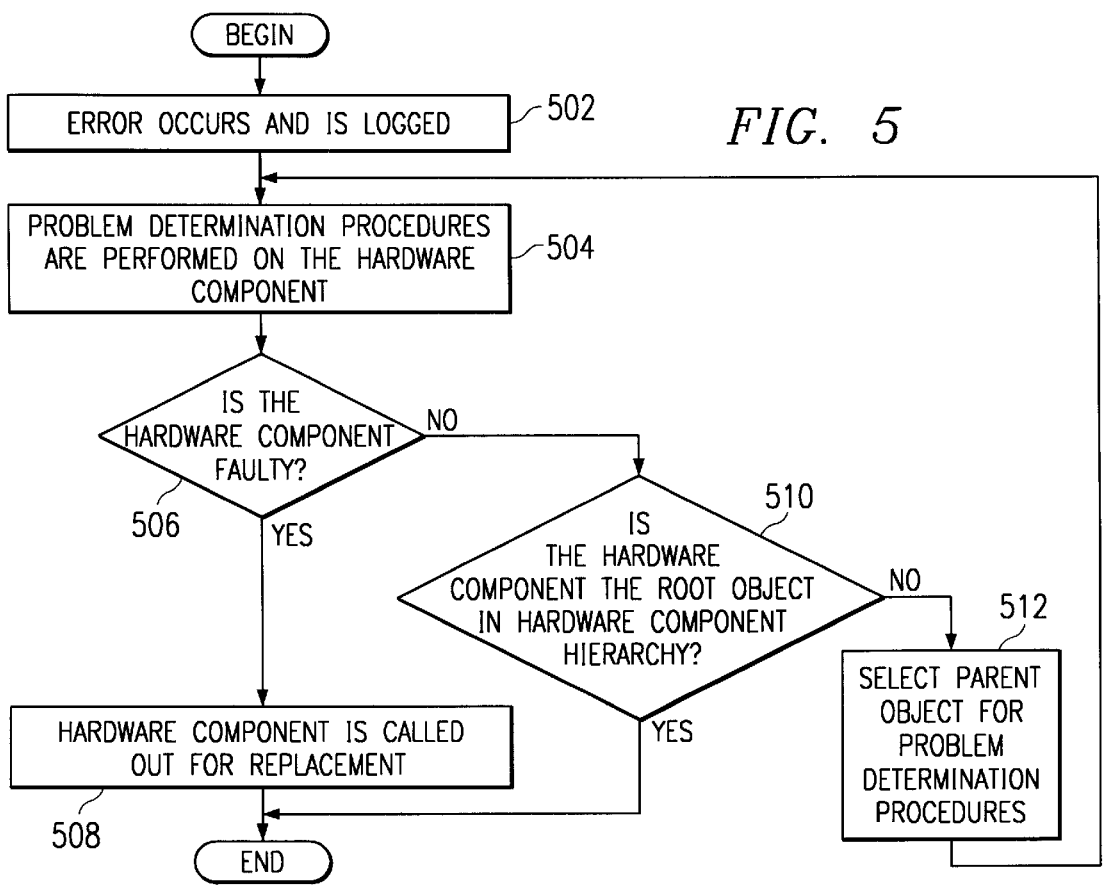
FIG. 5 is a flowchart depicting a method of determining the location of a faulty hardware component in a data processing system using a problem determination procedure in accordance with the present invention.

With reference now to FIG. 5, a flowchart depicts a method of determining the location of a faulty hardware component in a data processing system using a problem determination procedure in accordance with the present invention.

The process begins when an error occurs and is logged (step 502). Problem determination procedures are performed on the hardware component implicated by the error log (step 504). Problem determination procedures consist of testing the device and searching the error log for any errors logged against the device. If an error is found, then the detailed data is analyzed to determine the symptom, cause, FRU, etc. A determination is made as to whether the hardware component is faulty (step 506). If so, then the hardware component is called out for replacement (step 508).

If the component is not faulty, then a determination is made as to whether the hardware component currently being analyzed is the root object in the logical hierarchy of components (step 510). If so, then the process completes, and other measures may be taken to track the source of the error.

If the hardware component currently being analyzed is not the root object in the logical hierarchy of components, then the logically hierarchical parent of the implicated component is selected for analysis (step 512), and the process loops back to perform problem determination procedures on this component. This process continues until a faulty component is found or until the root component is analyzed.

The present invention may be automatically performed by the use of a controller application that invokes applications dependent on the device being tested. This is done by 'walking the tree' upward, starting with the device that has been selected to test. The present invention does not stop diagnosis or analysis with the 'suspected' device, even if it tests good, but rather keeps walking up the tree looking for an error on one of the parent devices. This is especially useful when using standalone diagnostics where the automatic invocation of diagnostic procedures is not done. In addition, the automatic invocation of diagnostic procedures due to an error log entry can be turned off.

Figure 6:
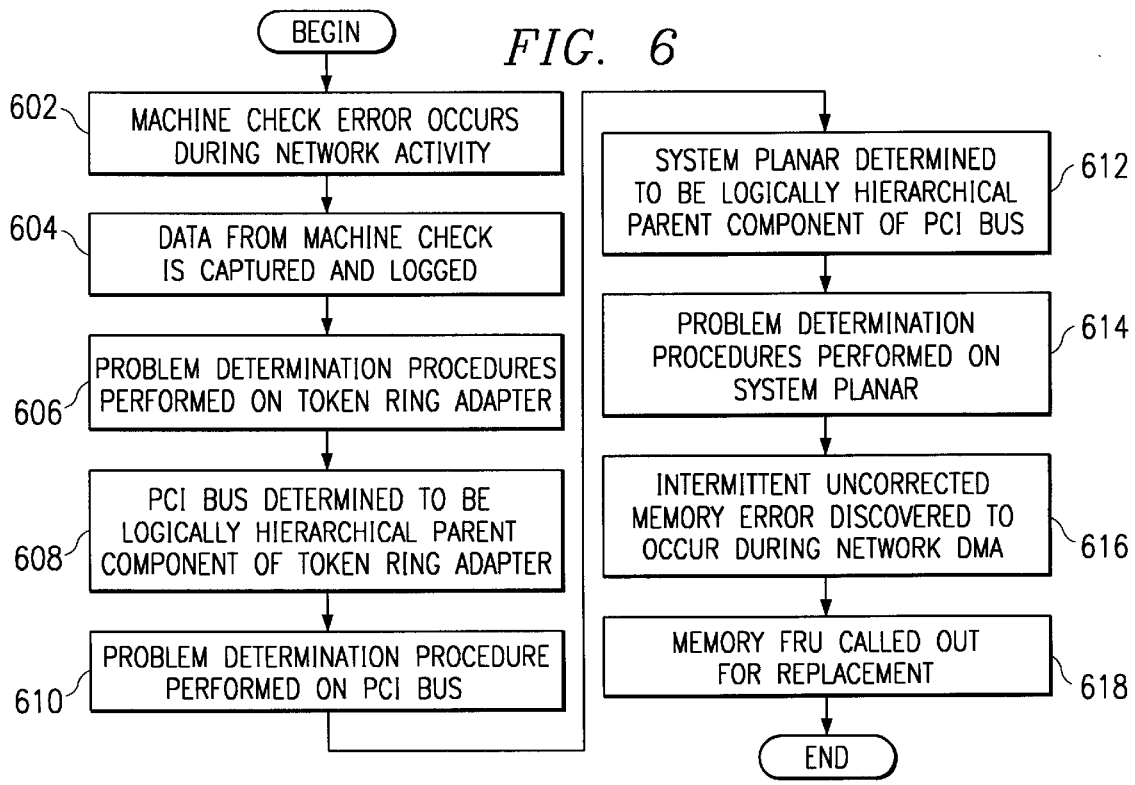
FIG. 6 is a flowchart depicting a method of determining a machine check error in a data processing system using a problem determination procedure in accordance with the present invention.

With reference now to FIG. 6, a flowchart depicts a method of determining a machine check error in a data processing system using a problem determination procedure in accordance with the present invention. The process begins with the occurrence of a machine check during network activity (step 602). The hardware platform then captures data from the machine check and logs it against the system planar device (step 604).

At some subsequent point in time, problem determination procedures are performed on the token ring adapter because the error occurred during a network operation (step 606). No problem is found because the token ring is not faulty. The logically hierarchical parent of the token ring adapter is determined to be the PCI bus (step 608). Problem determination procedures are performed on the PCI bus (step 610), and no problem is found because the PCI bus is not faulty. The logically hierarchical parent of the PCI bus is determined to be the system planar (step 612). Problem determination procedures are then performed on the system planar (step 614), during which the error log from the platform is analyzed for errors related to the system planar. During the error log analysis for the system planar, it is determined that an intermittent uncorrected memory error has occurred during network DMA (step 616). The memory FRU is then called out for replacement (step 618), and the process then completes.

The advantages provided by the present invention should be apparent in view of the detailed description of the invention provided above. The present invention provides a method and system for problem determination procedures in a hierarchically organized computer system. Rather than performing a potentially random search for faulty components, or an exhaustive test of all components, a hardware component is analyzed as a likely candidate, and if the hardware component is determined not to have problems, then its parent in a logical hierarchy of system components is analyzed for problems. In this manner, the problem determination procedure is automated, quicker, and more accurate, thus reducing time to diagnose the problem and preventing the possibility of incorrect parts being replaced as suspected faulty components. The problem determination procedure is performed on all hardware that is potentially related to the error symptom rather than all of the hardware in the system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include ROM chips or writable-type media such a floppy disc, a hard disk drive, a RAM, and CD-ROMs as well as transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for performing diagnostics on a data processing system, wherein hardware components of the data processing system are organized in a logical hierarchy, the method comprising the computer-implemented steps of:

initiating a diagnostics process;

analyzing a hardware component of the data processing system using a problem determination procedure;

in response to a determination that the hardware component does not have a problem, selecting the logically hierarchical parent hardware component of the hardware component for analysis; and in response to a determination that the hardware component does not have a logically hierarchical parent hardware component, performing an alternative problem determination procedure.

2. The method of claim 1 wherein the diagnostics process is automatically initiated in response to detection of a hardware-related error.

3. The method of claim 1 further comprising:

recording a hardware-related error.

4. The method of claim 3 wherein the hardware-related error is logged into an error log file.

5. The method of claim 4 wherein the hardware-related error implicates the hardware component.

6. A data processing system, wherein hardware components of the data processing system are organized in a logical hierarchy, the data processing system comprising:

initiating means for initiating a diagnostics process;

first analyzing means for analyzing a hardware component of the data processing system using a problem determination procedure;

selecting means for selecting, in response to a determination that the hardware component does not have a problem, the logically hierarchical parent hardware component of the hardware component for analysis; and execution means for executing, in response to a determination that the hardware component does not have a logically hierarchical parent hardware component, an alternative problem determination procedure.

7. The data processing system of claim 6 wherein the diagnostics process is automatically initiated in response to detection of a hardware-related error.

8. The data processing system of claim 6 further comprising:

recording means for recording hardware-related error.

9. The data processing system of claim 8 wherein the hardware-related error is logged into an error log file.

10. The data processing system of claim 9 wherein the hardware-related error implicates the hardware component.

11. A computer program product in a computer readable medium for use in a data processing system for performing diagnostics, wherein hardware components of the data processing system are organized in a logical hierarchy, the computer program product comprising:

instructions for initiating a diagnostics process;

instructions for analyzing a hardware component of the data processing system using a problem determination procedure;

instructions for selecting, in response to a determination that the hardware component does not have a problem, the logically hierarchical parent hardware component of the hardware component for analysis; and instructions for performing, in response to a determination that the hardware component does not have a logically hierarchical parent hardware component, an alternative problem determination procedure.

12. The computer program product of claim 11 wherein the diagnostics process is automatically initiated in response to detection of a hardware-related error.

13. The computer program product of claim 11 further comprising:

instructions for recording a hardware-related error.

14. The computer program product of claim 13 wherein the hardware-related error is logged into an error log file.

15. The computer program product of claim 14 wherein the hardware-related error implicates the hardware component.

* * * * *

UNITED STATES PATENT AND TRADEMARK OFFICE
CERTIFICATE OF CORRECTION

PATENT NO. : 6,532,552 B1
DATED : March 11, 2003
INVENTOR(S) : Benignus et al.

It is certified that error appears in the above-identified patent and that said Letters Patent is hereby corrected as shown below:

Column 8,
Line 3, before "Hardware-Related" insert -- a --.

Signed and Sealed this

Fourteenth Day of October, 2003

JAMES E. ROGAN
*Director of the United States Patent and Trademark Office*